United States Patent [19]

Engelmann et al.

[11] Patent Number: 5,093,187
[45] Date of Patent: Mar. 3, 1992

[54] TEAR STRIP

[75] Inventors: Eberhard Engelmann, Hamburg; Gert Schmeer, Bergen, both of Fed. Rep. of Germany

[73] Assignee: Beiersdorf AG, Hamburg, Fed. Rep. of Germany

[21] Appl. No.: 725,949

[22] Filed: Jun. 27, 1991

Related U.S. Application Data

[60] Continuation of Ser. No. 291,810, Dec. 29, 1988, abandoned, which is a division of Ser. No. 123,848, Nov. 23, 1987, abandoned.

[30] Foreign Application Priority Data

Nov. 29, 1986 [DE] Fed. Rep. of Germany ....... 3640861

[51] Int. Cl.$^5$ ................................................ B32B 7/00
[52] U.S. Cl. ................................... 428/212; 229/200; 428/343; 428/346; 428/349; 428/515; 428/516
[58] Field of Search .................. 428/43, 346, 212, 349, 428/515, 516; 206/605, 609, 610, 620, 630, 633

[56] References Cited

U.S. PATENT DOCUMENTS

| | | | |
|---|---|---|---|
| 2,517,801 | 8/1950 | Roush | 229/51 |
| 3,089,634 | 5/1963 | Heise et al. | 229/18 |
| 3,127,087 | 3/1964 | Spees | 229/51 |
| 3,502,540 | 3/1970 | Pietiocola | 428/515 |
| 3,520,469 | 7/1970 | Marx | 229/51 |
| 3,658,238 | 4/1972 | Nedstedt | 206/605 |
| 3,916,076 | 10/1975 | Eastis | 428/516 |
| 4,041,202 | 8/1977 | Williams | 428/172 |
| 4,150,184 | 4/1979 | Tesch | 428/43 |
| 4,337,284 | 6/1982 | Cooper et al. | 428/515 |
| 4,351,827 | 9/1982 | Williams | 428/42 |
| 4,439,478 | 3/1984 | Ferguson et al. | 428/515 |
| 4,557,971 | 12/1985 | Williams | 428/343 |
| 4,564,559 | 1/1986 | Wagner, Jr. et al. | 428/516 |
| 4,565,720 | 1/1986 | Yaeo et al. | 428/516 |
| 4,720,427 | 1/1988 | Clauson et al. | 428/516 |

FOREIGN PATENT DOCUMENTS

| | | | |
|---|---|---|---|
| 57-131556 | 8/1982 | Japan | 428/346 |
| 1194016 | 6/1970 | United Kingdom . | |
| 1436264 | 5/1976 | United Kingdom . | |

Primary Examiner—Paul J. Thibodeau
Attorney, Agent, or Firm—Sprung Horn Kramer & Woods

[57] ABSTRACT

Subject of the invention is a tear strip having a supporting base stretched in predominantly one direction, which strip may be provided with an adhesive layer and is characterized in that it has a supporting base of at least one base layer, which is provided with at least one tough layer, which is tougher than the base layer.

17 Claims, No Drawings

TEAR STRIP

This application is a continuation of application Ser. No. 291,810, filed 12/29/88, now abandoned, which is a division of application Ser. No. 123,848, filed Nov. 23, 1987, now abandoned.

BACKGROUND OF THE INVENTION

1. Field of the Invention

The subject of the invention is a tear strip having a supporting material which is stretched in substantially one direction and optionally is provided with an adhesive layer. The tear strip is suitable in particular for cardboard acticles.

2. Description of Related Art

Self-adhesive or heat-reactivated tear strips of polypropylene film stretched in longitudinal direction have been used for some time for the tearing open of cardboard articles. They are offered on the one hand in film thicknesses of 60–65 $\mu$m with a tensile strength in longitudinal direction of 230–330N/mm$^2$, equivalent to 55–85N/4 mm of strip width. On the other hand, on a small scale, tear strips are produced in thicknesses of 120–140 $\mu$m with a tensile strength in longitudinal direction of approximately 400N/mm$^2$, equivalent to 200–225 N/4 mm of strip width.

The polypropylene tear strips in 60–65 $\mu$m display a satisfactory tear behaviour with all corrugated cardboard articles, including micro-corrugated board. This finding applies irrespective of whether tearing is performed precisely in the direction of the adhesively affixed strip. "Precisely in the direction of the adhesively affixed strip" means that the tear strip is torn off in such a way that the direction of pulling never deviates from the direction which is specified by the tear strip affixed on the rear of the article and which becomes visible even from the front of the article during the tearing operation as a tear joint. Only then is the distribution of forces in the tear strip symmetrical during the tearing operation and the loading of both cut edges even. In practice, this ideal tear direction is usually not maintained. Deviations from this direction of up to approximately 30° must be expected.

The polypropylene tear strips in 60–65 $\mu$m thickness are suitable in the same way both for corrugated boards and for solid boards up to a basis weight of 600 g/m$^2$ with kraftliner face layers applied on both sides on the paper machine irrespective of the tear direction. Corresponding 1000 g/m$^2$ solid boards can only be torn open without any problems in the optimum tear direction. If there is a deviation from this direction, owing to the unsymmetrical loading of the strip, offshooting tears started from the more highly loaded edge of the strip may occur during the tearing operation. The frequency of the offshooting tears is influenced for example by inhomogeneities in the film, by micronicks in the cut edges of the film strips, by small pieces of wood or particularly compacted particles in the board and similar phenomena. In addition, the tearing speed has an effect.

In recent years, solid boards having a basis weight of between 450 and 600 g/m$^2$ have been used to an increasing extent for the packaging of detergents, in some cases having a wax-impregnated intermediate layer, but in any case with a laminated-on face layer of high gloss cast-coated Chromolux ® paper. Like the abovementioned 1000 g/m$^2$ solid boards, these boards can only be torn open with the 60–65 $\mu$m thick polypropylene tear strips with a similarly poor result.

Tear tests on corresponding cardboard articles by different test persons displayed tears in the tearing operation in 40–80% of cases. In individual cases, it was even observed that strips were torn off when torn open in the optimum tear direction. Of the known tear strips, only the 120–140 $\mu$m thick tear strips with a tensile strength in longitudinal direction of approximately 400N/mm$^2$, equivalent to 200–225N/4 mm, or thread-reinforced tear strips, which can be subjected to even higher loads, are suitable for these cases. Owing to the complex production processes and the high materials requirement, the commitment for both products is relatively expensive.

Tests have shown that a polypropylene tear strip film with a tensile strength in longitudinal direction of 320N/mm$^2$, as are used for the 60–65 $\mu$m tear strips, must have a thickness of approximately 140 $\mu$m in order to achieve satisfactory results on the abovementioned detergent cardboard boxes even in the case of a tear direction deviating by 30°. That is then equivalent to a load-bearing capacity of 180N/4 mm. For the expensive-to-produce film with a tensile strength in longitudinal direction of 400N/mm$^2$, which is known from the market only in 120–140 $\mu$m, this load-bearing capacity of 180 N/4 mm would still require a thickness of 112 $\mu$m.

There is thus the problem of producing tear strips which, with smallest possible thickness and thus lowest possible costs, satisfactorily tear open materials having a high tearing resistance, in particular cardboard articles with which the known 60–65 $\mu$m polypropylene tear strips fail.

There is in particular the problem of producing a tear strip provided with a pressure-sensitive or heat-sealable adhesive compound which has an oriented, predominantly longitudinally stretched supporting film which is predominantly of polypropylene and ensures, with smallest possible thickness, an optimum tearing result even if the tear direction deviates from the direction of the adhesively affixed strip. For mechanical processing of the tear strip, it is advantageous that a 4 mm wide tear strip is not extended by more than 10% under a load of 25N.

SUMMARY OF THE INVENTION

This problem is solved by a tear strip having a supporting base stretched in predominantly one direction, which strip is preferably provided with an adhesive layer and is characterized in that the supporting base consists of at least one base layer, which is provided with at least one tough layer, which is tougher than the base layer.

"Tough" and "tougher" in this case means in particular that the additional layer is structured such that, when subjected to an impact load from which the base layer already suffers a brittle fracture, said additional layer is deformed without fracture, with high elongation and energy absorption.

A tough layer preferably has a higher impact strength than the base layer. "Tough" means in particular "impact resistant".

DESCRIPTION OF THE PREFERRED EMBODIMENTS

Furthermore, a tear strip having a supporting base stretched in predominantly one direction, which strip preferably is provided with an adhesive layer and is characterized in that the supporting base consists of at least one base layer, which is provided with at least one tough layer containing a toughening additive, which tough layer is tougher than the base layer, is preferred.

"Tough" and "tougher" in this case means in particular that the additional layer is structured, by the use of suitable impact-resistant or toughening materials, such that, when subjected to an impact load from which the base layer already suffers a brittle fracture, said additional layer is deformed without fracture, with high elongation and energy absorption.

Furthermore, a tear strip is preferred having a supporting base stretched in predominantly one direction, which strip preferably is provided with an adhesive layer and is characterized in that it has a supporting base of at least one polypropylene-containing base layer, which base layer is provided with at least one polypropylene-containing tough layer, which is tougher than the base layer. It is preferred that the base layer and/or the supporting base contain predominantly polypropylen.

A tear strip having a supporting base stretched in predominantly one direction, which strip is provided with an adhesive layer and is characterized in that it has a supporting base of at least one base layer containing a polypropylene-olefin copolymer and/or a polypropylene toughening additive mixture, which base layer is provided with at least one polypropylene-containing tough layer, which contains a toughening additive and is tougher than the base layer, is particularly preferred.

It is preferred if the base layer or the base layers contain predominantly, preferably at least 70%, a polypropylene having a high, preferably at least 70%, isotactic proportion, in particular having approximately 95%.

Random or else block copolymers of propylene and olefins are preferably used. Used with particular preference are propylene-ethylene copolymers which contain up to 20% copolymerized ethylene.

The base layer or the base layers may contain up to 100% propylene-olefin copolymers or, admixed to these copolymers, may preferably contain up to 25% of a toughening additive. This is suitable for improving the tensile impact strength of polypropylene stretched in the web direction, in particular in the direction perpendicular thereto.

Preferred toughening additives are linear low density polyethylene (LLDPE), thermoplastic rubber such as butadiene-styrene copolymers (SBS) or isoprene-styrene copolymers (SIS), in particular their block copolymers in each case, or ethylene-vinyl acetate copolymers (EVA).

The base layers may also contain polypropylene homopolymer, but then have a toughening additive, preferably at least 10%, a maximum by preference of 30%, admixed.

Mixtures of the said propylene-olefin copolymers with the propylene homopolymer may also be used, it being possible for the proportion of the toughening additives to be reduced in accordance with the increasing copolymer proportion.

The toughening additives are preferably added individually. Mixtures of the specified toughening additives can also be used however.

The base layers preferably contain 75%-100% copolymer and 25%-0% LLDPE or 80%-100% copolymer with 20%-0% thermoplastic rubber, in particular SBS, or 75%-100% copolymer and 25%-0% EVA, but, particularly preferred, 80%-95% copolymer and 5%-20% LLDPE or 85%-95% copolymer and 5%-15% thermoplastic rubber, in particular SBS, or 85%-95% copolymer and 5%-15% EVA.

For the tough layer or the tough layers arranged on the base layer or the base layers, material mixtures are used which preferably contain clearly higher proportions of a toughening additive and/or are distinguished by a higher tensile impact strength than the base layers. A tough layer preferably contains polypropylene, in particular up to 65% propylene-olefin copolymer or 55% propylene-homopolymer, as specified for the base film, preferably at least 20% in each case, to which preferably 35% or 45%-80% of a toughening additive, in particular of the above-specified toughening additives LLDPE, thermoplastic rubbers or EVA, are added. The toughening additives are preferably added individually. Mixtures of the toughening additives are also possible however. Here too, mixtures of the said propylene-olefin copolymers with the propylene homopolymer may be used. As in the base layers, the toughening additive effects an improvement in the tensile impact strength, in particular transversely to the main direction of stretching.

The tough layers preferably contain 20%-50% copolymer and 80%-50% LLDPE or 50-70% copolymer and 50-30% thermoplastic rubber, in particular SBS, or 20-40% copolymer and 80%-60% EVA, but, particularly preferred, 30%-40% copolymer and 60%-70% LLDPE or 55%-65% copolymer and 35%-45% thermoplastic rubber, in particular SBS, or 25%-35% copolymer and 65%-75% EVA.

The same individual toughening additive is preferably used in each case in base layers and the tough layers. The use of different individual toughening additives or the same or different mixtures of toughening additives is also possible however.

The linear low density polyethylene (LLDPE) is a special ethylene copolymer having a density of 0.910-0.935 g/cm$^3$, copolymerized with the use of an olefin containing at least three, preferably 3-10 carbon atoms (see L. Schwiegk: "LLDPE—ein neues Polyäthylen" (LLDPE—A new polyethylene), Plastverarbeiter (Fabricator in plastics), 33rd year, 1982, No. 9, pages 1035-1037).

For the tear strip base film according to the invention, an LLDPE having 1-octene as comonomer, which has a density of approximately 0.920 g/cm$^3$, is preferably used.

A block copolymer having a styrene content of approximately 50% is preferably used as butadiene-styrene toughening additive. The use of similarly acting styrene-isoprene copolymers is likewise possible.

Base layers and/or tough face layers may additionally contain smaller proportions, preferably up to 10%, in particular up to 5%, of further suitable polymers and usual additives.

A polymer having a vinyl acetate content of 45% is preferably used as ethylene-vinyl acetate copolymer.

The supporting material of the tear strip according to the invention is obtained by extrusion and stretching of the individual layers in at least one direction and subsequent lamination in a known way, but preferably by coextrusion of the layers into a coextruded primary film and subsequent stretching of the primary film in at least one direction using usual, generally known methods.

Stretching is preferably carried out in longitudinal direction.

The stretching ratio in the stretching of the coextruded primary film in longitudinal direction is preferably 1:5 to 1:9, 1:6.5 to 1:7.5 being particularly preferred. A stretching ratio of 1:6 specifies that, from a section of the film of for example 1 m in length, a section of 6 m in length of the stretched film is produced. Other formulations are known for the expression "web direction", for example: longitudinal direction, machine running direction. Stretching takes place without the width of the primary film being reduced substantially, only the thickness of the film being affected.

Also the subject of the invention is the process for production of the tear strip according to the invention.

The thickness of the stretched supporting film may be 50–150 μm, preferably 60–120 μm, in particular 70–100 μm. Of this, the proportion made up by the base layer or base layers, taken together, is 50–90%, preferably 65–75% of the total thickness of the tear strip supporting base.

Preferably only one tough layer is applied, which is then laid with particular preference on the surface of the finished tear strip not provided with adhesive, so that the bonding of the tear strip takes place via the base layer. However, two or more tough layers may be applied or coextruded on top of one another on both surfaces of the base layer.

Furthermore, it is possible to arrange one or more tough layers between two or more base layers, which then may be provided with one or two tough layers on their outer lying surface. In this way, for example tear strips having five, preferably alternating, layers are obtained. Tear strips having a substantially larger number of individual layers can also be obtained.

The tear strips according to the invention are used preferably with a strip width of 2–8 mm, preferably 3–6 mm and have a thickness of 50–150 μm in particular 60–120 μm.

For the tearing operation and mechanical processing of the tear strip, it is advantageous that the strip is not extended by more than 10% under a load of ≧20N, preferably ≧25N, in particular ≧35N. The strip width, the thickness of the strip and the stretching ratio of the film are to be wellsuited to each other accordingly. Preferably, for production of the tear strip material from the supporting film, preferably a pressure-sensitive or heat-sealable adhesive compound, known per se, is applied to one side of the supporting film. In order to improve the anchorage of the adhesive compound, the surface may be pretreated by methods usually used for polyolefin surfaces, for example by corona or flame pretreatment. Special anchorage layers may likewise be used.

The subject of the invention is also equivalent or in a different way equipped tear strips or strips with the base to be torn open suitable joined or strips which may be joined in a suitable way. Preferred are all forms of the tear strip according to the invention which may be sticked or are sticked to the base to be torn open. The term "provided with an adhesive layer" therefore also denotes that the tear strip may be joined or is joined with the base, in particular may be sticked or is sticked to the base.

The reverse of the supporting film, not coated with adhesive compound, is preferably provided with an adhesive-repellent release layer.

All quantities, proportions and percentages are referred to the weight. "pbw" means parts by weight.

The following examples are intended to explain the invention, without restricting it to them.

EXAMPLE 1

A mixture I of 90 pbw polypropylene copolymer with 3–6% ethylene, melt flow index (230/2.16) 0.9±0.3 g/10 min., for example Propathene GSF 113 of the company ICI and 10 pbw of an LLDPE having a density of 0.920 g/cm$^3$, which contains 1-octene as comonomer, melt flow index (230/2.16) 3.0±0.5 g/10 min., for example Stamylex PE 1026 of the company DSM is melted and extruded in a main extruder of relatively high output rate. In a second, auxiliary extruder of lower output rate, a mixture II of 35 pbw of the above-specified polypropylene copolymer with 65 pbw of the above-specified polyethylene copolymer is likewise melted. The two extruders are coordinated in such a way that, by means of a "black box", a coextruded film having a total thickness of 620–650 μm and a width of approximately 1400 mm is extruded onto a chill roll via a slot die. In this case, the proportion of mixture I of the total thickness is approximately 450–470 μm, that of mixture II is 180–200 μm.

This primary film is fed via preheated rolls to a roll-type drawing frame of usual design and longitudinally stretched at temperatures of 100°–135° C. at a ratio of 1:7.5. The film obtained has a thickness of 83–87 μm and, after edge trimming, a width of 1200 mm. The proportion of mixture I of the total thickness is 60–63 μm. The stretched complete film has, in longitudinal direction, a tensile stress at 10% elongation of 35N/4 mm, an ultimate tensile stress of 73N/4 mm and an elongation at break of 40%. A self-adhesive tear strip is fabricated from this film in accordance with the state of the art.

A commercially available silicone release lacquer from the class of condensation-crosslinked two-component systems is applied to the coextrusion layer produced from mixture II. The release substance is applied as a 5% solution in toluene by means of a roller application unit. The coating thickness (dry) was 0.15 g/m$^2$.

A pressure-sensitive adhesive is applied to the corona-pretreated surface of the base layer.

The adhesive consists of 42 pbw styrene-isoprene block copolymer (SIS)
20 pbw pentaerythrite ester of hydrated colophony
37 pbw aliphatic hydrocarbon resin, softening point 85° C.,
1 pbw zinc butyldithiocarbamate.

The adhesive is applied to the corona-pretreated film surface as 40% solution in toluene with subsequent drying. The adhesive application is approximately 25 g/m$^2$. Application from the melt is also possible.

It was possible to dispense with the use of a special anchorage layer between supporting base and adhesive. It goes without saying that the polypropylene primers corresponding to the state of the art can be used.

It also goes without saying that all other types of compound usual in the case of adhesive tapes may be used, such as for example natural rubber compounds from solvent or dispersion, acrylate compounds from solvent, dispersion or melt.

After coating, the coated supporting webs are cut up on special cutting machines to 4 mm wide tear strips and wound up in the usual way to 10,000 m long large rolls.

EXAMPLE 2

As a departure from Example 1, a mixture I of 92 pbw of the polypropylene copolymer used in Example 1 and 8 parts by weight of a styrene-butadiene block copolymer having a styrene content of approximately 50% and a melt flow index (230/2.16) of 5–10 g/10 min. was used for the base layer.

For the coextrusion layer, a mixture II of 60 pbw of the above-specified polypropylene copolymer and 40 pbw of the above-specified styrene-butadiene block copolymer was used.

The two mixtures were prepared by initially mixing a mixture of 50 pbw polypropylene copolymer and 50 pbw styrene-butadiene block copolymer, extruding it as a strand and subsequently granulating it. The granules are then used to adjust to the above-specified mixing ratios with polypropylene copolymer, for example by mixing 80 pbw of the granules just described with 20 pbw of the polypropylene copolymer for mixture II. If the styrene-butadiene polymer is mixed in directly, an inhomogeneous distribution of this toughening additive, which is only effective when finely dispersed, is the result. The extrusion, film production and tear strip fabrication take place in the same way as in Example 1.

EXAMPLE 3

As a departure from Example 1, a mixture I of 88 pbw polypropylene copolymer and 12 pbw ethylene-vinyl acetate copolymer is used for the base layer. The ethylene-vinyl acetate copolymer has a vinyl acetate content of 45% and has, as a mixture of 40 pbw with 60 pbw Propathene GSF 113, a melt flow index 230/2.16 of 3.5–4.5 g/10 min.

For the coextrusion layer, a mixture II of 35 pbw polypropylene copolymer and 65 pbw ethylene-vinyl acetate is used.

COMPARISON EXAMPLES A–C

A mixture of 90 pbw polypropylene copolymer and 10 pbw LLDPE, corresponding to the mixture I of the base layer of Example I, is extruded into primary films having a thickness of 475 $\mu$m, 640 $\mu$m and 865 $\mu$m respectively and are stretched at a stretching ratio of 1:7.5 into films having a thickness of 63 $\mu$m, 85 $\mu$m and 115 $\mu$m.

These supporting films are likewise made into tear strips and compared in the tear test described below with the tear strips according to the invention.

The suitability testing of the tear strips in the tear test was carried out as follows: Punched blanks form original 10 kg detergent cardboard boxes, produced from solid board with wax impregnation, laminated with a high gloss cast-coated Chromolux paper, with original printing on the paper side, total basis weight 590 g/m² had the 4 mm wide tear strips to be tested adhesively affixed to them over a length of 60 cm at the place also envisaged in practice. It should be pointed out at this stage that boards may display different tear behaviour in the machine direction of board production and perpendicularly thereto, so that the tear direction intended by the cardboard article producer must also be maintained for the comparative testing of the test. In order to ensure a good absorption of the pressure-sensitive adhesive compound, a 2 kg heavy steel roller was rolled twice over the affixed strips. The cardboard articles treated in this way were subsequently stored for 24 hours at room temperature. For the actual tear test, these boards were then placed on a table top with the tear strip facing downwards. Various test persons had to tear open these test boards over the full length, beginning with the prepunched tab, a deviation of 30° from the optimum tear direction having to be maintained. The board was at the same time held firmly by one hand on the table top, the other hand being used to carry out the tearing operation. In this test, the approximately 60 cm long bonding length was torn open in three intervals of 20 cm in each case. The test persons were instructed not to behave cautiously but to exert their full strength. In order to assess a tear strip version, 100 tearing operations were evaluated. At least two versions were always mixed into one test series. At least three persons with the same number of tearing operations in each case, but at least 66, were involved in a test series. As the result, the lowest and highest failure rate in percent, found by the individual test persons, was specified for each test version. A tearing through of the tear strip during the tearing operation was evaluated as failure.

By comparative tests on 10 folded, filled and closed detergent boxes in each case, the results thus obtained were once again reproduced exactly according to practice. If the finding was "failure rate 0%", the two test methods coincided. Otherwise, the simplified "unfolded" test arrangement produced slightly (max. 10%) higher failure rates.

Only the evaluation of the "unfolded" test arrangement was used for the assessment of the examples and comparison examples.

In the following Table 1, the tear strips according to Examples 1–3 are compared with those of comparison examples A, B and C. Figures given are the thickness and the values characterizing the tensile stress/elongation behaviour in longitudinal direction, measured at a testing rate of 300 mm/min, of the stress at 10% elongation, of the ultimate tensile stress and of the elongation at break, referred to 4 mm wide test strips. In the final column of the table, the results of the test described above are given in "% failures".

TABLE 1

| Example | Thickness $\mu$m | Stress at 10% elongation N/4 mm | Ultimate tensile stress, Longitudinally N/4 mm | Elongation at break, Longitudinally % | Tear test failures % |
| --- | --- | --- | --- | --- | --- |
| 1 | 85 | 35 | 73 | 40 | 0 |
| 2 | 83 | 28 | 65 | 45 | 0 |
| 3 | 85 | 30 | 67 | 43 | 0 |
| for comparison | | | | | |
| A | 63 | 40 | 75 | 35 | 52–81 |
| B | 85 | 52 | 100 | 35 | 43–71 |
| C | 115 | 73 | 140 | 35 | 31–48 |

It is found that the tear strips according to the invention have a satisfactory, and thus substantially better tear behaviour than the comparison examples A, B and C. Example A corresponds here to the base layer of Example 1 without coextruded tough layer, on the other hand in its tear behaviour also to the 60–65 $\mu$m thick tear strips available on the market. Examples B and C represent Example A in the thickness increased to 85 and 115 $\mu$m, respectively, and correspondingly higher values for stress at 10% elongation and ultimate tensile stress, both measured in longitudinal direction. Even the 115 $\mu$m thick strip of Example C (without coextruded tough layer), with an ultimate tensile stress which is almost twice as high as in Examples 1–3, has comparatively a completely inadequate tear behaviour, while the only 85 μm thick coextruded tear strips according to the invention pass the tear test without any failures.

Surprisingly, it was thus found that tear strips according to the invention from longitudinally stretched polypropylene could be produced which function satisfactorily on the abovementioned cardboard articles in any tear direction and at the same time have less than 50% of the load-bearing capacity in the tensile test in longitudinal direction, as given further above as 180N/4 mm=675N/15 mm for satisfactorily functioning tear strips according to the state of the art.

We claim:

1. A closed structure provided with a tear strip which does not extend by more than 10% under a load equal to 20N, said tear strip comprising a polymeric supporting base adhered to the structure, the supporting base consisting of at least one layer and at least one polymeric layer which is tougher than the base layer adhered thereto, tearing of the tear strip serving to tear open the structure.

2. A structure according to claim 1, wherein the supporting base consists of at least one base layer which is provided with at least one tough layer containing a toughening additive, which tough layer is tougher than the base layer.

3. A structure according to claim 1, wherein the supporting base consists of at least one polypropylene-containing base layer which is provided with at least one polypropylene-containing tough layer which is tougher than the base layer.

4. A structure according to claim 1, wherein the supporting base consists of at least one base layer containing at least one of a polypropylene-olefin copolymer and a polypropylene toughening additive mixture, which base layer is provided with at least one polypropylene-containing tough layer which contains a toughening additive and is tougher than the base layer.

5. A structure according to claim 1, wherein the base layer contains a toughening additive.

6. A structure according to claim 1, wherein the thickness of the base layer or base layers is 50–90% of the tear strip thickness.

7. A structure according to claim 1, wherein the tough layer contains linear low density polyethylene as toughening additive.

8. A structure according to claim 1, wherein the tough layer contains thermoplastic rubber as toughening additive.

9. A structure according to claim 1, wherein the tough layer contains an ethylene-vinyl acetate copolymer as toughening additive.

10. A structure according to claim 1, wherein the supporting base is provided with a pressure sensitive compound.

11. A structure according to claim 1, wherein the tear strip is provided with a hot-sealing compound.

12. A structure according to claim 1, wherein the supporting base was obtained by coextrusion of the individual layers and subsequent stretching.

13. A structure according to claim 1, wherein the structure is a package.

14. A structure according to claim 1, wherein the structure is a closed cardboard container.

15. A method of opening a closed article which comprises providing said article with a tear strip which does not extend by more than 10% under a load equal to 20N, said tear strip comprising a polymeric supporting base adhered to the structure, the supporting base consisting of at least one layer and at least one polymeric layer which is tougher than the base layer adhered thereto, and pulling on said tear strip thereby to open said article.

16. A closed structure provided with a tear strip having a supporting base stretched in predominantly one direction and adhered to the structure, the supporting base comprising at least one polypropylene-containing base layer and at least one polypropylene-containing tough layer which is tougher than the base layer, tearing of the tear strip serving to tear open the structure.

17. A method of opening a closed article which comprises providing said article with a tear strip having a supporting base stretched in predominantly one direction and adhered to the article, the supporting base comprising at least one polypropylene-containing base layer and at least one polypropylene-containing tough layer which is tougher than the base layer, and pulling on the tear strip thereby to open the article.

* * * * *

UNITED STATES PATENT AND TRADEMARK OFFICE
CERTIFICATE OF CORRECTION

PATENT NO. : 5,093,187
DATED : March 3, 1992
INVENTOR(S) : Engelmann, et. al.

It is certified that error appears in the above-indentified patent and that said Letters Patent is hereby corrected as shown below:

On the Title page, item [56] col. 2, line, delete "4,351,827" and substitute -- 4,351,877--.

Signed and Sealed this

Nineteenth Day of October, 1993

Attest:

BRUCE LEHMAN

*Attesting Officer*     *Commissioner of Patents and Trademarks*